(12) United States Patent
You et al.

(10) Patent No.: US 10,506,580 B2
(45) Date of Patent: Dec. 10, 2019

(54) UPLINK DATA TRANSMISSION METHOD AND DEVICE (71) Applicant: HUAWEI TECHNOLOGIES CO., LTD., Shenzhen, Guangdong (CN)

(72) Inventors: Chunhua You, Shanghai (CN); Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/148,251

(22) Filed: Oct. 1, 2018

(65) Prior Publication Data
US 2019/0037546 A1 Jan. 31, 2019

Related U.S. Application Data (63) Continuation of application No. PCT/CN2016/078385, filed on Apr. 1, 2016.

(51) Int. Cl.
H04W 72/04 (2009.01)
H04W 16/14 (2009.01)

(52) U.S. Cl.
CPC ..... *H04W 72/042* (2013.01); *H04W 72/0446* (2013.01); *H04W 72/0453* (2013.01); *H04W 16/14* (2013.01)

(58) Field of Classification Search
CPC ........... H04W 72/042; H04W 72/0453; H04W 72/0446; H04W 72/1289; H04W 24/00; H04W 16/14; H04W 74/0808
See application file for complete search history.

(56) References Cited

U.S. PATENT DOCUMENTS

2017/0064558 A1* 3/2017 Li .................. H04W 16/14
2017/0150367 A1   5/2017 Han et al.
(Continued)

FOREIGN PATENT DOCUMENTS

CN   104581908 A   4/2015
CN   105323049 A   2/2016
(Continued)

OTHER PUBLICATIONS

R1-156575, CATT, "Design of UL LBT for LAA," 3GPP TSG RAN WG1 Meeting #83, Anaheim, USA, Nov. 15-22, 2015 (4 pp.).
R2-151383, Institute for Information Industry (III), "Discussion on Uplink Transmission in LAA," 3GPP TSG RAN WG2 meeting #89bis, Bratislava, Slovakia, Apr. 20-24, 2015 (4 pp.).
(Continued)

*Primary Examiner* — Afshawn M Towfighi
(74) *Attorney, Agent, or Firm* — Kilpatrick Townsend & Stockton LLP (57) ABSTRACT The present disclosure provides an uplink data transmission method at a terminal device, which includes: receiving in a subframe m, first resource allocation indication information from a network device; starting to listen on a channel of the LAA cell before the subframe m+n; if detecting, after a start moment of the first time unit and before a start moment of a $t^{th}$ time unit, that the channel is in an idle state, sending uplink data in $t^{th}$ to $s^{th}$ time units, where t is greater than 1 and less than or equal to s; and if detecting, before the start moment of the first time unit, that the channel is in the idle state, sending uplink data in the s time units. Therefore, the uplink data can be efficiently sent, and spectrum utilization of the LAA cell can be improved.

12 Claims, 6 Drawing Sheets (56) References Cited

U.S. PATENT DOCUMENTS

| | | | | |
|---|---|---|---|---|
| 2017/0231006 A1* | 8/2017 | Yin | ................... | H04W 74/0816 |
| 2017/0367123 A1* | 12/2017 | Wang | ................... | H04W 76/16 |
| 2018/0167826 A1 | 6/2018 | Sun et al. | | |
| 2018/0206269 A1* | 7/2018 | Bhorkar | ................ | H04W 72/14 |

FOREIGN PATENT DOCUMENTS

| | | |
|---|---|---|
| CN | 105338531 A | 2/2016 |
| CN | 105392144 A | 3/2016 |
| CN | 105451237 A | 3/2016 |
| EP | 3131225 A1 | 2/2017 |
| EP | 3399822 A1 | 11/2018 |
| WO | 2015149294 A1 | 10/2015 |
| WO | 2016048212 A1 | 3/2016 |

OTHER PUBLICATIONS

R1-153286, Institute for Information Industry (III), "Discussion on LAA Uplink Transmission," 3GPP TSG RAN WG1 meeting #81, Fukuoka, Japan, May 25-29, 2015 (4 pp.).

R1-152990, Alcatel-Lucent Shanghai Bell et al., "LBT and Frame Structure Design for LAA with DL and UL," 3GPP TSG RAN WG1 Meeting #81, Fukuoka, Japan, May 25-29, 2015, pp. 1-4.

International Search Report, dated Dec. 28, 2016, in International Application No. PCT/CN2016/078385 (4 pp.).

Written Opinion of the International Searching Authority, dated Dec. 28, 2016, in International Application No. PCT/CN2016/078385 (7 pp.).

Extended European Search Report, dated Nov. 22, 2018, in European Application No. 16896098.7 (12 pp.).

International Search Report, dated Dec. 28, 2016, in International Application No. PCT/CN2016/078385 (6 pp.).

* cited by examiner

UPLINK DATA TRANSMISSION METHOD AND DEVICE

CROSS-REFERENCE TO RELATED APPLICATIONS

This application is a continuation of International Application No. PCT/CN2016/078385, filed on Apr. 1, 2016, the disclosure of which is hereby incorporated by reference in its entirety.

TECHNICAL FIELD

Embodiments of the present disclosure relate to the communications field, and more specifically, to an uplink data transmission method and a device.

BACKGROUND

After an unlicensed cell is introduced to Long Term Evolution (LTE), the spectrum does not need to be licensed and can be freely used by any person or any organization because the unlicensed cell uses an unlicensed spectrum. Therefore, before sending data, a network element in an LTE system needs to first perform listen before talk (LBT) to detect whether a channel is occupied. If the channel is occupied, the network element continues to listen on the channel, and does not send the data until detecting that the channel is idle. A base station can start to transmit data provided that the base station detects that a channel is idle. User equipment (UE) can transmit data only when two conditions are met. The first condition is that the UE obtains an uplink resource allocated by the base station and required for data transmission, and the second condition is that the UE performs successful LBT.

The base station may allocate an uplink resource in a licensed-assisted access (LAA) cell to the UE in a subframe m. After obtaining the allocated resource, the UE performs LBT before a subframe m+4 to detect whether a channel is occupied. If the channel is occupied, the LBT fails, and the UE does not send uplink data in the subframe m+4. If the channel is not occupied, the LBT succeeds, and the UE sends uplink data by using the LAA cell in the subframe m+4. The base station receives the uplink data at a preset time-frequency resource location according to a format specified by the base station.

Usually, a base station or UE that uses an LAA cell needs to contend with a Wireless Fidelity (WiFi) device for permission to use a channel, and the WiFi device does not need to know a subframe boundary of an LTE cell. If the UE in the LAA cell starts to perform LBT at a short period before the subframe boundary of the LAA cell, a conflict is likely to occur, and consequently a probability that the UE preempts the channel is relatively low. Therefore, the 3rd Generation Partnership Project (3GPP) determines behavior of the base station/the UE, namely, continuously performing LBT.

However, the base station currently allocates the uplink resource to the UE in a format of an entire subframe. That is, the base station considers, by default, that the UE sends data by using an entire uplink subframe in terms of time, and if the UE preempts only some resources in a subframe, the UE cannot send uplink data.

SUMMARY

The present disclosure provides an uplink data transmission method and a device, so that even if a terminal device does not preempt spectrum resources of an entire subframe, uplink data can be efficiently sent, and therefore spectrum utilization of a licensed-assisted access LAA cell can be improved.

According to a first aspect, an uplink data transmission method is provided, including: receiving, by a terminal device in a subframe m, first resource allocation indication information sent by a network device, where the first resource allocation indication information is used to indicate a first time-frequency resource that is allocated by the network device to the terminal device and that is used for uplink transmission, the first time-frequency resource occupies a subframe m+n in a licensed-assisted access LAA cell, the subframe m+n includes s time units, m is a subframe index number, n and s are positive integers, and a value of s is greater than or equal to 2; starting, by the terminal device, to listen on a channel of the LAA cell before the subframe m+n; if detecting, after a start moment of the first time unit in the s time units and before a start moment of a $t^{th}$ time unit, that the channel is in an idle state, sending, by the terminal device, uplink data to the network device in $t^{th}$ to $s^{th}$ time units in the s time units, where t is greater than 1 and less than or equal to s; and if detecting, before the start moment of the first time unit in the s time units, that the channel is in the idle state, sending, by the terminal device, uplink data to the network device in the s time units.

It should be understood that, that the terminal device starts to listen on the channel of the LAA cell before the subframe m+n may be described as follows: The terminal device starts to continuously listen on the channel of the LAA cell before the subframe m+n. Continuous listening may be understood as always listening on the channel until the listening succeeds, or may be understood as listening on the channel before each time unit of the s time units in the subframe m+n starts until the listening succeeds, or may be understood as: a time interval between two successive times of listening is less than a preset value. The preset value may be any proper value specified by a standard.

In this embodiment of the present disclosure, the time unit may be understood as a time unit that includes an orthogonal frequency division multiplexing (OFDM) symbol. For example, one time unit may include seven OFDM symbols (corresponding to one timeslot in an existing LTE standard). A quantity of OFDM symbols included in one time unit is not limited in the present disclosure.

Optionally, duration of the s time units may be the same, or duration of some of the s time units is the same, or duration of every two of the s time units is different. In addition, a value of n is specified by a communications protocol.

Generally, the value of n is 4, and/or the value of s is 2.

Optionally, resource allocation indication information indicates locations of time-frequency resources in some time units in the subframe m+n, and the terminal device deduces, according to a preset rule, locations of time-frequency resources in all time units in the subframe m+n. Alternatively, resource allocation indication information indicates locations of resources in all time units in the subframe m+n, and the terminal device may determine, based on an indication of the resource allocation indication information, all time-frequency resources allocated by the network device to the terminal device.

Therefore, according to the uplink data transmission method in this embodiment of the present disclosure, the terminal device can send the uplink data on preempted time-frequency resources in some time units in a subframe.

Therefore, the uplink data can be efficiently sent, and spectrum utilization of the LAA cell can be improved.

With reference to the first aspect, in a first possible implementation of the first aspect, duration of the s time units is equal, and before the terminal device detects that the channel is in the idle state, the method further includes: generating, by the terminal device, a first TB and a second TB based on a transport block TB size indicated by the network device and an amount of to-be-sent data in an uplink buffer of the terminal device, where a size of the second TB is greater than a size of the first TB;

the sending uplink data to the network device in $t^{th}$ to $s^{th}$ time units in the s time units includes: sending the first TB to the network device in the $t^{th}$ to $s^{th}$ time units in the s time units; and the sending uplink data to the network device in the s time units includes: sending the second TB to the network device in the s time units.

That is, the terminal device may prepare two transport blocks of different sizes. If the terminal device detects, in the subframe m+n, that the channel of the LAA cell is in the idle state (in other words, LBT succeeds), the terminal device may send the smaller transport block in a time unit after a moment at which the LBT succeeds. Therefore, a transport block of a proper size can be sent, and the uplink data can be efficiently transmitted.

In addition, optionally, when the value of s is 2, namely, one subframe includes two time units, the size of the second TB is twice that of the first TB.

It should be understood that when the terminal device needs to send a sounding reference signal (SRS), the terminal device preferably sends the SRS. For example, if one time unit includes only one OFDM symbol, the last symbol in the subframe m+n may be used to send the SRS instead of the uplink data.

With reference to the first possible implementation of the first aspect, in a second possible implementation of the first aspect, the second TB does not include data in the first TB.

In other words, the terminal device may determine the second TB based on a buffer result obtained after the first TB is deducted, so that complexity of preparing a TB by the terminal device can be reduced.

Optionally, the first TB includes a Media Access Control (MAC) control element (CE), and the second TB includes a MAC CE. Therefore, the terminal device may notify the network device of some information by using the MAC CE, and the information includes but is not limited to an amount of data that still needs to be sent by the terminal device to the network device and an amount of power headroom (PH) of the terminal device.

With reference to the first or the second possible implementation of the first aspect, in a third possible implementation of the first aspect, the method further includes: receiving, by the terminal device in a subframe m+k, second resource allocation indication information sent by the network device, where the second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0; if sending the first TB to the network device in the $t^{th}$ to $s^{th}$ time units in the s time units, sending, by the terminal device, the second TB to the network device in the subframe m+n+k; and if sending the second TB to the network device in the s time units, sending, by the terminal device, a third TB to the network device in the subframe m+n+k, where the third TB includes all data in the first TB.

Therefore, the terminal device may send, in next uplink transmission, a TB that is prepared before current transmission but is not sent in the current transmission, to efficiently send the uplink data.

Optionally, a value of k is 1. In this case, if the terminal device detects, before the $s^{th}$ time unit in the subframe m+n, that the channel of the LAA cell is in the idle state, the terminal device may send the uplink data to the network device in all time units in a subframe m+n+1. It may also be understood that if the network device continuously schedules the terminal device, the terminal device merely needs to prepare two TBs for first transmission. Therefore, implementation of UE can be simplified.

With reference to any one of the first to the third possible implementations of the first aspect, in a fourth possible implementation of the first aspect, the sending the first TB to the network device in the $t^{th}$ to $s^{th}$ time units in the s time units includes: determining, based on a modulation and coding scheme MCS indicated by the network device, a first target MCS used when the first TB is sent to the network device in the $t^{th}$ to $s^{th}$ time units, and sending the first TB to the network device in the $t^{th}$ to $s^{th}$ time units by using the first target MCS; and the sending the second TB to the network device in the s time units includes: determining, based on the modulation and coding scheme MCS indicated by the network device, a second target MCS used when the second TB is sent to the network device in the s time units, and sending the second TB to the network device in the s time units by using the second target MCS.

With reference to the fourth possible implementation of the first aspect, in a fifth possible implementation of the first aspect, the MCS indicated by the network device is an MCS used when the terminal device sends the uplink data to the network device in the s time units;

the determining, based on a modulation and coding scheme MCS indicated by the network device, a first target MCS used when the first TB is sent to the network device in the $t^{th}$ to $s^{th}$ time units includes: determining the first target MCS based on the MCS indicated by the network device and a correspondence between the MCS and a quantity of time units occupied when the terminal device sends the uplink data; and the determining, based on the modulation and coding scheme MCS indicated by the network device, a second target MCS used when the second TB is sent to the network device in the s time units includes: determining the MCS indicated by the network device as the second target MCS.

In the method in this embodiment of the present disclosure, regardless of which MCS that the network device instructs the terminal device to use, the terminal device may determine, based on an indication of the network device, an MCS used when the uplink data is actually sent. Therefore, the terminal device may modify baseband processing, so that even if a size of a preempted time-frequency resource is different from that of a time-frequency resource corresponding to the MCS indicated by the network device, a data block with a size indicated by the network device can still be sent, thereby flexibly sending the uplink data.

According to a second aspect, a terminal device is provided, where the terminal device is configured to perform the method in the first aspect or any possible implementation of the first aspect. Specifically, the terminal device includes a unit configured to perform the method in the first aspect or any possible implementation of the first aspect.

According to a third aspect, a terminal device is provided, including a processor, a memory, a receiver, and a transmitter. The processor, the memory, the receiver, and the transmitter are connected by using a bus system. The memory is configured to store an instruction, and the processor is configured to execute the instruction stored in the memory to control the receiver to receive information and control the transmitter to send information, so that the terminal device performs the method in the first aspect or any possible implementation of the first aspect.

According to a fourth aspect, a computer readable medium is provided, and is configured to store a computer program, where the computer program includes an instruction used to perform the method in the first aspect or any possible implementation of the first aspect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

FIG. 4 (a) and FIG. 4 (b) are schematic diagrams of a method for determining an uplink transport block according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

To help understand the embodiments of the present disclosure, several elements that are used in descriptions of the embodiments of the present disclosure are first described herein.

Licensed spectrum and unlicensed spectrum: Spectrums used in a wireless communications system are classified into a licensed spectrum and an unlicensed spectrum. After the licensed spectrum is granted, usually a corresponding licensed carrier may be used to perform a related communication service, and there is no resource contention problem. For example, in a Long Term Evolution (LTE) system, on a transmit end, once an initial sending time of a data frame is determined, subsequent data frames are successively sent. Correspondingly, on a receive end, once an initial sending time of a data frame is obtained by using a synchronous signal, a receiving time of each of subsequent data frames is determined, and the receive end does not need to adjust the receiving time of each received frame. For the unlicensed spectrum, a corresponding unlicensed carrier may be legitimately used by any person to perform a communication service. However, when the unlicensed carrier is used to perform data transmission, data starts to be transmitted only after a resource is preempted in a time-based contention manner, and data sending needs to stop after the data is transmitted for a period of time, to release a channel, so that another device has an opportunity to occupy the channel.

A licensed cell is a cell that uses a licensed spectrum, and the licensed cell may also be referred to as a normal cell, for example, an LTE cell in existing LTE. An unlicensed cell is a cell that uses an unlicensed spectrum, and the unlicensed cell may be a LAA cell and/or a standalone LAA cell.

Listen before talk (LBT): A station (for example, a base station) that needs to transmit data first listens to a to-be-used spectrum resource, to determine whether there is another station that is transmitting data. If a to-be-used frequency resource is idle, the station may transmit data; otherwise, the station attempts to transmit data again after a period of time. An LBT rule is usually used in an unlicensed spectrum transmission mechanism.

The technical solutions in the embodiments of the present disclosure may be applied to various communications systems, for example, a Global System for Mobile Communications (GSM), a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunication System (UMTS), and a future 5G communications system.

In the embodiments of the present disclosure, a terminal device (Terminal Equipment) may also be referred to as user equipment, a mobile station (MS), a mobile terminal, or the like. The user equipment may communicate with one or more core networks by using a radio access network (RAN). For example, the user equipment may be a mobile phone (also referred to as a "cellular" phone) or a computer with a mobile terminal. For example, the user equipment may be a portable, pocket-sized, handheld, computer built-in, or in-vehicle mobile apparatus, a terminal device in a future 5G network, or a terminal device in a future evolved PLMN network.

In the embodiments of the present disclosure, a network device may be a device configured to communicate with the user equipment. The network device may be a base transceiver station (BTS) in a GSM or CDMA system, or may be a NodeB (NB) in a WCDMA system, or may be an evolved NodeB (eNB or eNodeB) in an LTE system. Alternatively, the network device may be a relay node, an access point, an in-vehicle device, a wearable device, a network-side device in a future 5G network, a network device in a future evolved PLMN network, or the like.

Figure 1:
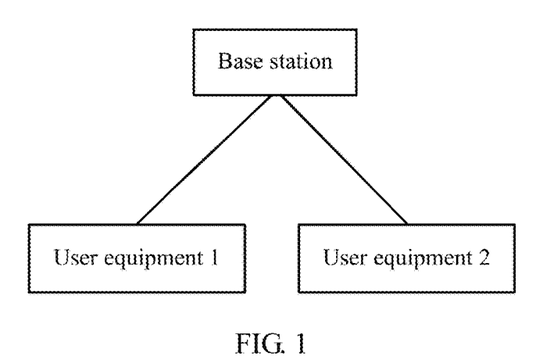
FIG. 1 is a schematic diagram of an application scenario of an embodiment of the present disclosure.

FIG. 1 shows an application scenario of an embodiment of the present disclosure. As shown in FIG. 1, an eNB is connected to two user equipments (user equipment 1 (UE 1) and user equipment 2 (UE 2)). The eNB provides a communication service for the UE 1 and the UE 2, and a cell of the eNB may operate in a licensed spectrum or may operate in an unlicensed spectrum.

It should be understood that the two UEs shown in FIG. 1 are merely examples, and are not intended to limit the application scope of the present disclosure. The eNB may be connected to only one UE, or may be connected to a plurality of UEs. This is not limited in the present disclosure.

It should be noted that an example in which one time unit includes seven OFDM symbols, in other words, one time unit is one timeslot, is used below to describe specific embodiments of the present disclosure. The example is merely for ease of description, and does not constitute any limitation on the protection scope of the present disclosure.

Figure 2:
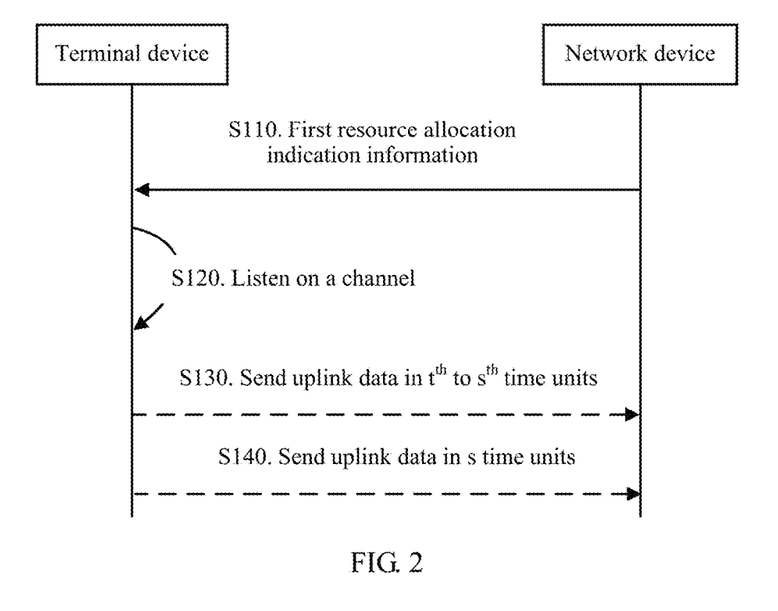
FIG. 2 is a schematic flowchart of an uplink data transmission method according to an embodiment of the present disclosure.

FIG. 2 is a schematic flowchart of an uplink data transmission method according to an embodiment of the present disclosure. As shown in FIG. 2, the method 100 includes the following steps.

S110. A terminal device receives, in a subframe m, first resource allocation indication information sent by a network device, where the first resource allocation indication information is used to indicate a first time-frequency resource that is allocated by the network device to the terminal device and that is used for uplink transmission, the first time-frequency resource occupies a subframe m+n in a licensed-assisted access LAA cell, the subframe m+n includes s time units, m is a subframe index number, n and s are positive integers, and a value of s is greater than or equal to 2.

Optionally, the network device may send the first resource allocation indication information to the terminal device by using a licensed cell, or the network device may send the first resource allocation indication information to the terminal device by using an unlicensed cell. This is not limited in the present disclosure.

An example in which one subframe includes two timeslots, namely, the value of s is 2, is used below to describe a method in which the first resource allocation indication information sent by the network device is used to indicate a time-frequency resource used for uplink transmission. The first resource allocation indication information may indicate physical resource blocks that are in the two timeslots in the subframe and on which time-frequency resources allocated by the network device to the terminal device are specifically located. It may also be understood that the network device allocates the time-frequency resources used for uplink transmission to the terminal device in a format of the entire subframe. In this case, the terminal device may determine time-frequency resources in all timeslots in the subframe based on an indication of the received first resource allocation information.

Figure 3:
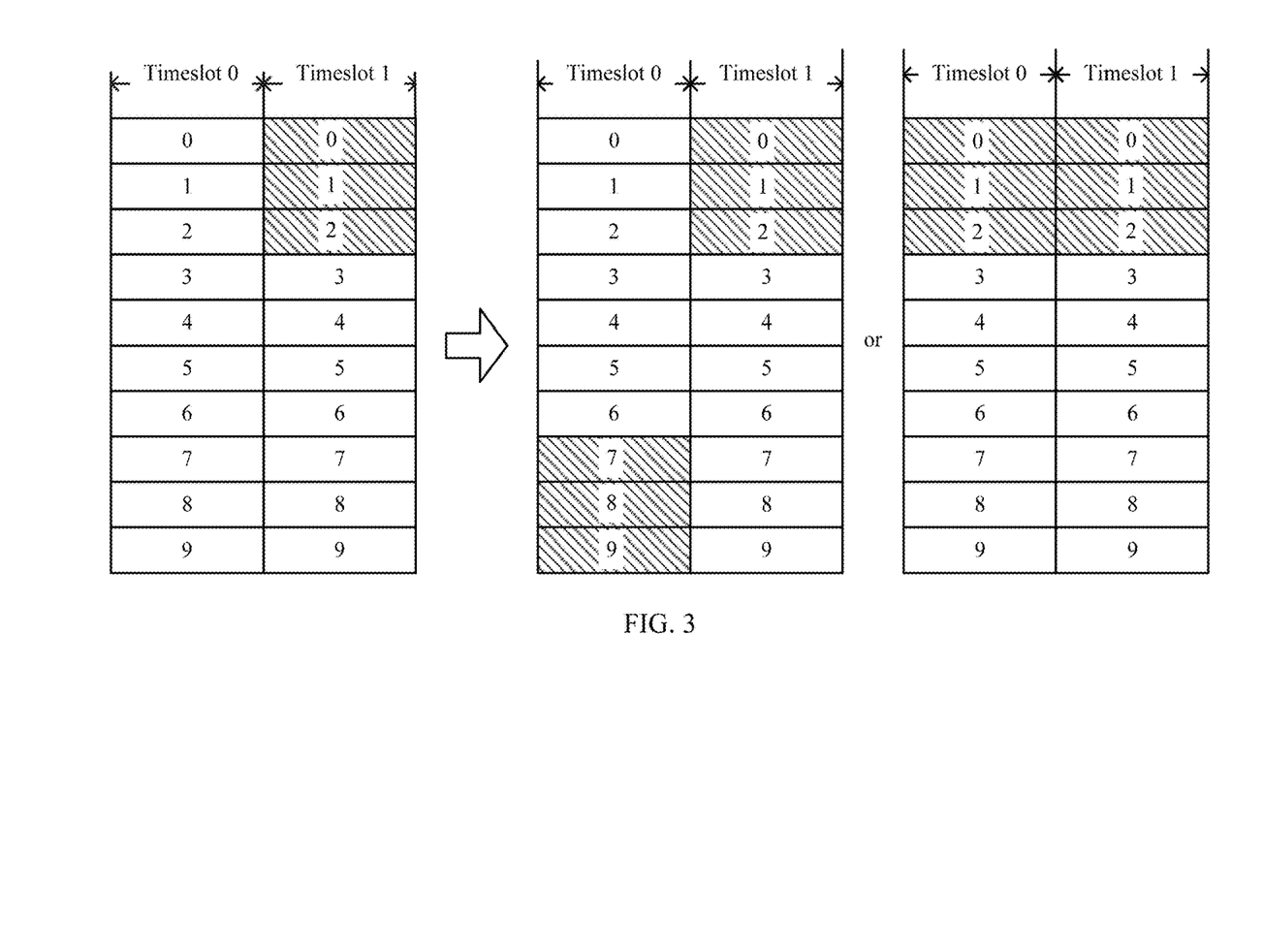
FIG. 3 is a schematic diagram of a method for determining a time-frequency resource used for uplink transmission according to an embodiment of the present disclosure.

Optionally, the first resource allocation indication information may merely indicate some of the time-frequency resources allocated by the network device to the terminal device, for example, may merely indicate physical resource blocks that are in the first timeslot and on which some of the time-frequency resources in the first timeslot are specifically located. It may be understood that the network device allocates the time-frequency resources to the terminal device in a format of a half subframe. The terminal device deduces, based on a deviation value between physical resource blocks in the two timeslots, all time-frequency resources allocated by the network device to the terminal device. For example, as shown in FIG. 3, assuming that the time-frequency resources indicated by the first resource allocation indication information are located on physical resource blocks numbered 0/1/2 in the second timeslot (slot) (timeslot 1) (parts filled with slashes in FIG. 3), and assuming that the deviation value between serial numbers of the physical resource blocks in the two timeslots is 7, the terminal device deduces that all the time-frequency resources allocated by the network device to the terminal device should be located on physical resource blocks numbered 7/8/9 in the first timeslot (timeslot 0) and the physical resource blocks numbered 0/1/2 in the second timeslot (the parts filled with slashes in FIG. 3). Optionally, the deviation value may be 0. In this case, the terminal device deduces that uplink resources should be located on physical resource blocks numbered 0/1/2 in the first timeslot and the physical resource blocks numbered 0/1/2 in the second timeslot (the parts filled with slashes in FIG. 3). The deviation value is not limited in the present disclosure.

Further, the deviation value may be explicitly configured by the network device to the terminal device by using a radio resource control (RRC) message. For example, the network device may add, to an RRC connection establishment message sent to the terminal device, information indicating the deviation value. The deviation value may alternatively be implicitly deduced by the terminal device based on another parameter. For example, the deviation value may be equal to a quarter of a system bandwidth.

S120. The terminal device starts to listen on a channel of the LAA cell before the subframe m+n.

S130. If detecting, after a start moment of the first time unit in the s time units and before a start moment of a $t^{th}$ time unit, that the channel is in an idle state, the terminal device sends uplink data to the network device in $t^{th}$ to $s^{th}$ time units in the s time units, where t is greater than 1 and less than or equal to s.

S140. If detecting, before the start moment of the first time unit in the s time units, that the channel is in the idle state, the terminal device sends uplink data to the network device in the s time units.

Specifically, after obtaining the first resource allocation indication information, the terminal device performs LBT before the subframe m+n, to detect whether the channel is occupied. If the terminal device detects, before the first time unit in the s time units starts, that the channel is in the idle state, the terminal device may send the uplink data to the network device in the s time units. It may also be understood that the terminal device preempts all of the first time-frequency resource that is in the subframe m+n and that is allocated by the network device to the terminal device. If the terminal device detects, after the first time unit starts and before the $t^{th}$ time unit starts, that the channel is in the idle state, the terminal device sends the to-be-sent uplink data to the network device in the $t^{th}$ to $s^{th}$ time units. It may also be understood that the terminal device preempts only a part of the first time-frequency resource that is in the subframe m+n and that is allocated by the network device to the terminal device.

Therefore, different from the prior art, in the uplink data transmission method in this embodiment of the present disclosure, even if the terminal device preempts only some resources in the subframe, the terminal device can successfully transmit the uplink data, and therefore spectrum utilization of the LAA cell can be improved.

It should be understood that after receiving the first resource allocation indication information, the terminal device needs to prepare a transport block (TB) used for uplink transmission, namely, an uplink TB. When preparing the uplink TB, the terminal device does not know a result of the LBT, and therefore does not know which time-frequency resources are available. Therefore, optionally, the terminal device needs to prepare TBs of different sizes, and the terminal device may prepare the TBs of different sizes by using different methods. A specific method to be used may be configured by the network device. For example, the network device may configure the terminal device by using an RRC layer message.

Optionally, the terminal device generates a first TB and a second TB based on a transport block TB size indicated by the network device and an amount of to-be-sent data in an uplink buffer of the terminal device. A size of the second TB is greater than a size of the first TB.

Further, the second TB block does not include data in the first TB block. In other words, the terminal device may generate the second TB block based on an amount of data in the buffer from which the data in the first TB block is deducted. In the method, the terminal device generates a TB block in a relatively simple manner, and therefore implementation of the terminal device can be simplified.

It may be understood that in addition to indication information used to indicate the first time-frequency resource that is allocated by the network device to the terminal device and that is used for uplink transmission, the first resource allocation indication information received by the terminal device may include indication information used to indicate, to the terminal device, a size of a TB block that needs to be transmitted by the terminal device.

Therefore, the terminal device prepares two TBs of different sizes, and the terminal device may determine, based on a size of a preempted time-frequency resource (or understood as a moment at which it is detected that the channel is in the idle state), a TB that actually needs to be sent. Specifically, if the terminal device detects, after the first time unit in the s time units starts and before the $t^{th}$ time unit starts, that the channel is in the idle state, the terminal device sends the first TB in the $t^{th}$ to $s^{th}$ time units. If the terminal device detects, before the first time unit starts, that the channel in the idle state, the terminal device sends the second TB in the s time units.

Figure 4:
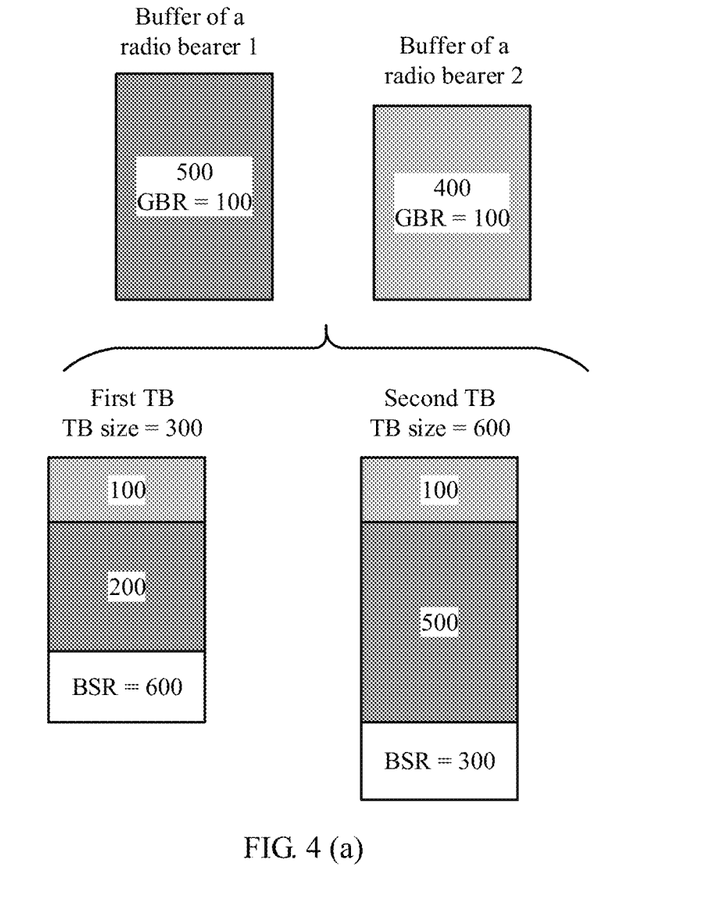

A method for preparing a TB by the terminal device in this embodiment of the present disclosure is described below by using a specific example. As shown in FIG. 4 (a) and FIG. 4 (b), it is assumed that two radio bearers (RB) are respectively an RB 1 and an RB 2, there is 500-byte to-be-sent data in a buffer corresponding to the RB 1, there is 400-byte to-be-sent data in a buffer corresponding to the RB 2, and guaranteed bit rates (GBR) of both the RB 1 and the RB2 are 100 bytes. The terminal device may determine data included in the TB according to the Link Control Protocol (LCP). Assuming that the size of the first TB configured by the network device is 300 bytes, the terminal device takes 200 bytes from the buffer corresponding to the RB 1 and takes 100 bytes from the buffer corresponding to the RB 2, to constitute the first TB. In FIG. 4 (a), assuming that the terminal device already triggers a buffer status report (BSR), the BSR reports that 600-byte data is remaining after the first TB is assembled. Then, the terminal device also prepares the second TB based on a fact that there is 500-byte to-be-sent data in the buffer corresponding to the RB 1, and there is 400-byte to-be-sent data in the buffer corresponding to the RB 2. According to a rule of the LCP, the terminal device takes 500 bytes from the buffer corresponding to the RB 1 and takes 100 bytes from the buffer corresponding to the RB 2, to constitute the second TB. The BSR reports that 300-byte data is remaining after the second TB is assembled.

It should be noted that the terminal device may prepare the first TB before the second TB, or may prepare the second TB before the first TB.

Optionally, if the terminal device needs to send the first TB, the terminal device discards the second TB, and if the terminal device needs to send the second TB, the terminal device discards the first TB. Alternatively, the terminal device may wait for a next transmit opportunity to send a TB in next transmission that is not sent in current transmission.

Further, as shown in FIG. 4 (b), the terminal device may prepare the second TB based on a buffer result obtained after the data in the first TB is deducted. After the data in the first TB is deducted, there is 300-byte data in the buffer corresponding to the RB 1, there is 300-byte data in the buffer corresponding to the RB 2, and the terminal device places all 600-byte data in the second TB. In this case, there is no data in the buffers corresponding to the RB 1 and the RB 2. Therefore, no BSR is sent.

It should be noted that, when the terminal device prepares the second TB based on the buffer result obtained after the data in the first TB is deducted, the terminal device prepares different TBs in sequence. The sequence is reflected by a value of the BSR. In this method, regardless of which TB is sent, data of the other TB needs to be re-placed in the buffer such as a Radio Link Control (RLC) layer buffer, to wait for a next transmit opportunity. In addition, in some cases, the BSR carried in the TB may not be accurate. For example, in FIG. 4 (b), if the second TB is transmitted, the network device considers that there is no data in the buffer of the terminal device. In actual, there is still 300-byte to-be-sent data in the buffer of the terminal device. Therefore, if the network device instructs the terminal device to prepare the TB by using the method shown in FIG. 4 (b), after the network device receives the TB sent by the terminal device, when the network device allocates a resource to the terminal device for next uplink transmission, the network device may allocate, to the terminal device, more time-frequency resources than time-frequency resources that are required by the terminal device and that are indicated in the BSR carried in the received TB. In addition, even if the TB received by the network device carries no BSR, the network device allocates a time-frequency resource to the terminal device for next uplink transmission.

It should be understood that, regardless of which method is used by the terminal device to prepare the TB, if there is a Media Access Control (MAC) control element (CE) that needs to be sent, the terminal device needs to add the MAC CE to all TBs, to ensure that the MAC CE can be normally transmitted.

It should further be understood that when not all of the s time units have equal duration, a plurality of TBs of different sizes need to be prepared, and a quantity of sizes of TBs are in a one-to-one correspondence with a quantity of duration values of time units. The method for preparing a TB may be performed by using the method shown in FIG. 4 (a) and FIG. 4 (b).

In this embodiment of the present disclosure, optionally, the terminal device receives, in a subframe m+k, second resource allocation indication information sent by the network device. The second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0.

If sending the first TB to the network device in the $t^{th}$ to $s^{th}$ time units in the s time units, the terminal device sends the second TB to the network device in the subframe m+n+k.

If sending the second TB to the network device in the s time units, the terminal device sends a third TB to the network device in the subframe m+n+k. The third TB includes all data in the first TB.

It should be noted that, when the terminal device receives the second resource allocation indication information in the subframe m, the second resource allocation indication information and the first resource allocation indication information may be sent by the network device on different carriers in the subframe m. However, the present disclosure is not limited thereto.

It may be understood that in this embodiment of the present disclosure, the terminal device listens on the channel of the LAA cell before the subframe m+n+k starts, and determines, based on a moment at which it is detected that the channel is in the idle state, a time-frequency resource that is in the subframe m+n+k and that is used for uplink transmission. In addition, if the terminal device sends the first TB in the subframe m+n, the terminal device sends the second TB to the network device in the subframe m+n+k. If the terminal device sends the second TB in the subframe m+n, the terminal device sends the first TB in the subframe m+n+k, or the third TB obtained by combining all the data in the first TB with other data.

In this case, the terminal device merely needs to prepare two TBs for first transmission, and therefore implementation of the terminal device can be simplified.

Further, the terminal device needs to determine a data transmission format used when the first TB or the second TB is sent, namely, a modulation and coding scheme (MCS).

Specifically, the terminal device determines, based on an MCS indicated by the network device, a first target MCS used when the first TB is sent, and determines, based on the MCS indicated by the network device, a second target MCS used when the second TB is sent.

Optionally, the terminal device may determine, based on the MCS indicated by the network device and a correspondence between the MCS and a quantity of time units occupied when the terminal device sends the uplink data, a target MCS used when the uplink data is actually sent. For example, the terminal device may pre-store a correspondence between a quantity of occupied time units and a to-be-used MCS. For example, the terminal device may pre-store a table, and the table stores the correspondence. The table may be in a form shown in Table 1 (numbers in the table are merely examples). Values in Table 1 are MCS index values, and different values are corresponding to different coding rates and modulation orders. The table may be specified by a protocol, or may be configured by the network device.

TABLE 1

| Corresponding MCS used when one time unit is occupied to send uplink data | Corresponding MCS used when two time units are occupied to send uplink data |
|---|---|
| 22 | 16 |
| 24 | 17 |

For example, it is assumed that the subframe m+n includes two time units, in other words, the value of s is 2.

If the MCS indicated by the network device is an MCS used when the terminal device sends the uplink data in the two time units, namely, an MCS 16, and if the terminal device detects, before the first time unit starts, that the channel is in the idle state, in other words, the terminal device occupies the two time units to send the uplink data, the terminal device transmits the prepared TB on an air interface by using the MCS 16 indicated by the network device. If the terminal device detects, after the first time unit starts and before the second time unit starts, that the channel is in the idle state, the terminal device may search Table 1 to determine that an MCS that is corresponding to the MCS 16 and that should be used when the terminal device occupies one time unit to send the uplink data is an MCS 22, and the terminal device transmits the prepared TB on the air interface by using the MCS 22.

Similarly, if the MCS indicated by the network device is an MCS used when the terminal device sends the uplink data in one time unit, namely, an MCS 24, and if the terminal device detects, after the first time unit starts and before the second time unit starts, that the channel is in the idle state, the terminal device transmits the prepared TB on the air interface by using the MCS 24 indicated by the network device. If the terminal device detects, before the first time unit starts, that the channel is in the idle state, the terminal device may search Table 1 to determine that an MCS that is corresponding to the MCS 24 and that should be used when the terminal device occupies two time units to send the uplink data is an MCS 17, and the terminal device transmits the prepared TB on the air interface by using the MCS 17.

Because both the terminal device and the network device store the foregoing table, the network device may correctly decode the received uplink data.

Therefore, the terminal device may modify baseband processing, to flexibly send the uplink data and reduce complexity of the terminal device.

The uplink data transmission method according to the embodiments of the present disclosure is described above in detail with reference to FIG. 2 to FIG. 4, and a terminal device according to the embodiments of the present disclosure is described below in detail with reference to FIG. 5 and FIG. 6.

Figure 5:
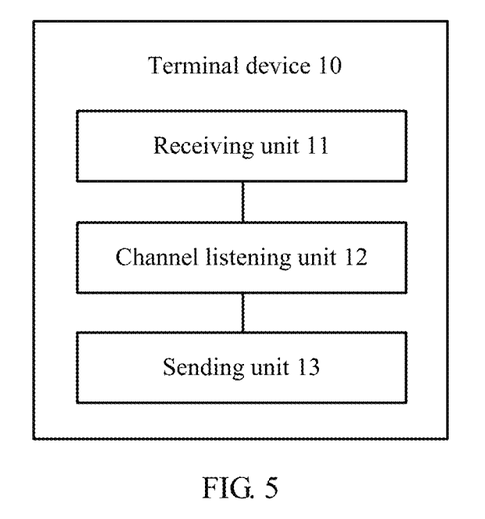
FIG. 5 is a schematic block diagram of a terminal device according to an embodiment of the present disclosure.
Figure 6:
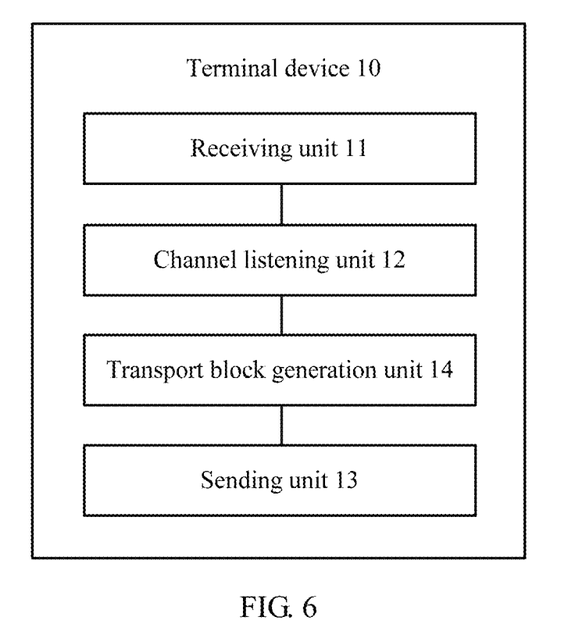
FIG. 6 is another schematic block diagram of a terminal device according to an embodiment of the present disclosure.

FIG. 5 shows a terminal device 10 according to an embodiment of the present disclosure. As shown in FIG. 5, the terminal device 10 includes a receiving unit 11, a channel listening unit 12, and a sending unit 13.

The receiving unit 11 is configured to receive, in a subframe m, first resource allocation indication information sent by a network device. The first resource allocation indication information is used to indicate a first time-frequency resource that is allocated by the network device to the terminal device and that is used for uplink transmission, the first time-frequency resource occupies a subframe m+n in a licensed-assisted access LAA cell, the subframe m+n includes s time units, m is a subframe index number, n and s are positive integers, and a value of s is greater than or equal to 2.

The channel listening unit 12 is configured to start to listen on a channel of the LAA cell before the subframe m+n.

The sending unit 13 is configured to: if the channel listening unit detects, after a start moment of the first time unit in the s time units and before a start moment of a $t^{th}$ time unit, that the channel is in an idle state, send uplink data to the network device in $t^{th}$ to $s^{th}$ time units in the s time units, where t is greater than 1 and less than or equal to s.

The sending unit 13 is further configured to: if the channel listening unit detects, before the start moment of the first time unit in the s time units, that the channel is in the idle state, send uplink data to the network device in the s time units.

Therefore, the terminal device in this embodiment of the present disclosure can send the uplink data on preempted time-frequency resources in some time units in a subframe. Therefore, the uplink data can be efficiently sent, and spectrum utilization of the LAA cell can be improved.

In this embodiment of the present disclosure, optionally, duration of the s time units is equal. As shown in FIG. 6, the terminal device further includes a transport block generation unit 14.

The transport block TB generation unit 14 is configured to: before the channel listening unit detects that the channel is in the idle state, generate a first TB and a second TB based on a transport block TB size indicated by the network device and an amount of to-be-sent data in an uplink buffer of the terminal device. A size of the second TB is greater than a size of the first TB.

The sending unit 13 is specifically configured to send the first TB to the network device in the $t^{th}$ to $s^{th}$ time units in the s time units.

The sending unit 13 is further specifically configured to send the second TB to the network device in the s time units.

In this embodiment of the present disclosure, optionally, the second TB does not include data in the first TB.

In this embodiment of the present disclosure, optionally, the receiving unit 11 is further configured to receive, in a subframe m+k, second resource allocation indication information sent by the network device. The second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0.

The sending unit 13 is further configured to:

if the sending unit 13 sends the first TB to the network device in the $t^{th}$ to $s^{th}$ time units in the s time units, send the second TB to the network device in the subframe m+n+k; and if the sending unit 13 sends the second TB to the network device in the s time units, send a third TB to the network device in the subframe m+n+k, where the third TB includes all data in the first TB.

In this embodiment of the present disclosure, optionally, the sending unit 13 is specifically configured to: determine, based on a modulation and coding scheme MCS indicated by the network device, a first target MCS used when the first TB is sent to the network device in the $t^{th}$ to $s^{th}$ time units, and send the first TB to the network device in the $t^{th}$ to $s^{th}$ time units by using the first target MCS.

The sending unit 13 is further specifically configured to: determine, based on the modulation and coding scheme MCS indicated by the network device, a second target MCS used when the second TB is sent to the network device in the s time units, and send the second TB to the network device in the s time units by using the second target MCS.

In this embodiment of the present disclosure, optionally, the MCS indicated by the network device is an MCS used when the terminal device sends the uplink data to the network device in the s time units.

In terms of determining, based on the modulation and coding scheme MCS indicated by the network device, the first target MCS used when the first TB is sent to the network device in the $t^{th}$ to $s^{th}$ time units, the sending unit 13 is specifically configured to determine the first target MCS based on the MCS indicated by the network device and a correspondence between the MCS and a quantity of time units occupied when the terminal device sends the uplink data.

In terms of determining, based on the modulation and coding scheme MCS indicated by the network device, the second target MCS used when the second TB is sent to the network device in the s time units, the sending unit 13 is specifically configured to determine the MCS indicated by the network device as the second target MCS.

It should be understood that the terminal device 10 in this embodiment of the present disclosure may be corresponding to the terminal device that performs the method 100 in the embodiment of the present disclosure. The foregoing and other operations and/or functions of the units in the terminal device 10 are separately intended to implement corresponding procedures performed by the terminal device in the method in FIG. 2. For brevity, details are not described again herein.

Therefore, the terminal device in this embodiment of the present disclosure can send the uplink data on preempted time-frequency resources in some time units in a subframe. Therefore, the uplink data can be efficiently sent, and spectrum utilization of the LAA cell can be improved.

Figure 7:
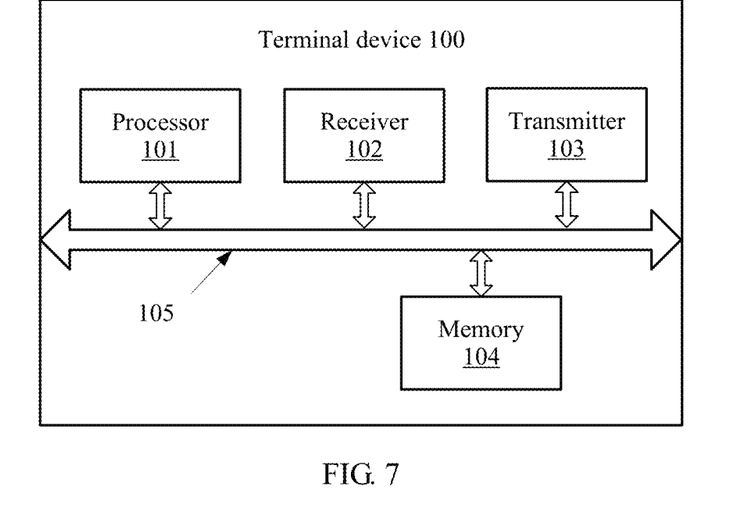
FIG. 7 is a schematic block diagram of a terminal device according to another embodiment of the present disclosure.

As shown in FIG. 7, an embodiment of the present disclosure further provides a terminal device 100. The terminal device 100 includes a processor 101, a receiver 102, a transmitter 103, and a memory 104. The processor 101, the memory 104, the receiver 102, and the transmitter 103 are connected by using a bus system 105. The memory 104 is configured to store an instruction, and the processor 101 is configured to execute the instruction stored in the memory 104, to control the receiver 102 to receive a signal and control the transmitter 103 to send a signal. The receiver 102 is configured to receive, in a subframe m, first resource allocation indication information sent by a network device. The first resource allocation indication information is used to indicate a first time-frequency resource that is allocated by the network device to the terminal device and that is used for uplink transmission, the first time-frequency resource occupies a subframe m+n in a licensed-assisted access LAA cell, the subframe m+n includes s time units, m is a subframe index number, n and s are positive integers, and a value of s is greater than or equal to 2. The processor 101 is configured to start to listen on a channel of the LAA cell before the subframe m+n. The transmitter 103 is configured to: if the channel listening unit detects, after a start moment of the first time unit in the s time units and before a start moment of a $t^{th}$ time unit, that the channel is in an idle state, send uplink data to the network device in $t^{th}$ to $s^{th}$ time units in the s time units, where t is greater than 1 and less than or equal to s. The transmitter 103 is further configured to: if the channel listening unit detects, before the start moment of the first time unit in the s time units, that the channel is in the idle state, send uplink data to the network device in the s time units.

Therefore, the terminal device in this embodiment of the present disclosure can send the uplink data on preempted time-frequency resources in some time units in a subframe. Therefore, the uplink data can be efficiently sent, and spectrum utilization of the LAA cell can be improved.

It should be understood that in this embodiment of the present disclosure, the processor 101 may be a central processing unit (CPU), or the processor 101 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 104 may include a read-only memory and a random access memory, and provides an instruction and data for the processor 101. A part of the memory 104 may further include a nonvolatile random access memory. For example, the memory 104 may further store information about a device type.

In addition to a data bus, the bus system 105 may include a power bus, a control bus, a status signal bus, and the like. However, for clarity of description, various buses are marked as the bus system 105 in the figure.

In an implementation process, the steps in the foregoing method may be completed by using an integrated logic circuit of hardware in the processor 101 or by using an instruction in a form of software. The steps of the method disclosed with reference to the embodiments of the present disclosure may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 104. The processor 101 reads information in the memory 104, and completes the steps of the foregoing method in combination with hardware of the processor. To avoid repetition, details are not described herein.

Optionally, in an embodiment, duration of the s time units is equal. The processor 101 is further configured to: before the channel listening unit detects that the channel is in the idle state, generate a first TB and a second TB based on a transport block TB size indicated by the network device and an amount of to-be-sent data in an uplink buffer of the terminal device. A size of the second TB is greater than a size of the first TB.

The transmitter 103 is specifically configured to send the first TB to the network device in the $t^{th}$ to $s^{th}$ time units in the s time units.

The transmitter 103 is further specifically configured to send the second TB to the network device in the s time units.

Optionally, in an embodiment, the second TB does not include data in the first TB.

Optionally, in an embodiment, the receiver 102 is further configured to receive, in a subframe m+k, second resource allocation indication information sent by the network device. The second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0.

The transmitter 103 is further configured to:

if the transmitter 103 sends the first TB to the network device in the $t^{th}$ to $s^{th}$ time units in the s time units, send the second TB to the network device in the subframe m+n+k; and if the transmitter 103 sends the second TB to the network device in the s time units, send a third TB to the network device in the subframe m+n+k, where the third TB includes all data in the first TB.

Optionally, in an embodiment, the transmitter 103 is specifically configured to: determine, based on a modulation and coding scheme MCS indicated by the network device, a first target MCS used when the first TB is sent to the network device in the $t^{th}$ to $s^{th}$ time units, and send the first TB to the network device in the $t^{th}$ to $s^{th}$ time units by using the first target MCS.

The transmitter 103 is further specifically configured to: determine, based on the modulation and coding scheme MCS indicated by the network device, a second target MCS used when the second TB is sent to the network device in the s time units, and send the second TB to the network device in the s time units by using the second target MCS.

Optionally, in an embodiment, the MCS indicated by the network device is an MCS used when the terminal device sends the uplink data to the network device in the s time units.

In terms of determining, based on the modulation and coding scheme MCS indicated by the network device, the first target MCS used when the first TB is sent to the network device in the $t^{th}$ to $s^{th}$ time units, the transmitter 103 is specifically configured to determine the first target MCS based on the MCS indicated by the network device and a correspondence between the MCS and a quantity of time units occupied when the terminal device sends the uplink data.

In terms of determining, based on the modulation and coding scheme MCS indicated by the network device, the second target MCS used when the second TB is sent to the network device in the s time units, the transmitter 103 is specifically configured to determine the MCS indicated by the network device as the second target MCS.

It should be understood that the terminal device 100 in this embodiment of the present disclosure may be corresponding to the terminal device 10 in the embodiment of the present disclosure, and may be corresponding to the terminal device that performs the method 100 in the embodiment of the present disclosure. The foregoing and other operations and/or functions of the modules in the terminal device 100 are separately intended to implement corresponding procedures performed by the terminal device in the method in FIG. 2. For brevity, details are not described again.

Therefore, the terminal device in this embodiment of the present disclosure can send the uplink data on preempted time-frequency resources in some time units in a subframe. Therefore, the uplink data can be efficiently sent, and spectrum utilization of the LAA cell can be improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An uplink data transmission method, comprising:
    receiving, by a terminal device in a subframe m, first resource allocation indication information sent by a network device, wherein the first resource allocation indication information is used to indicate a first time-frequency resource that is allocated by the network device to the terminal device and that is used for uplink transmission, the first time-frequency resource occupies a subframe m+n in a licensed-assisted access (LAA) cell, the subframe m+n comprises s time units, m is a subframe index number, n and s are positive integers, and a value of s is greater than or equal to 2;
    starting, by the terminal device, to listen on a channel of the LAA cell before the subframe m+n;
    if detecting, after a start moment of the first time unit in the s time units and before a start moment of a $t^{th}$ time unit, that the channel is in an idle state, sending, by the terminal device, uplink data to the network device in $t^{th}$ to $s^{th}$ time units in the s time units, wherein t is greater than 1 and less than or equal to s; and
    if detecting, before the start moment of the first time unit in the s time units, that the channel is in the idle state, sending, by the terminal device, uplink data to the network device in the s time units.

2. The method according to claim 1, wherein duration of the s time units is equal, and before the terminal device detects that the channel is in the idle state, the method further comprises:
    generating, by the terminal device, a first transport block (TB) and a second TB based on a TB size indicated by the network device and an amount of to-be-sent data in an uplink buffer of the terminal device, wherein a size of the second TB is greater than a size of the first TB;
    the sending uplink data to the network device in $t^{th}$ to $s^{th}$ time units in the s time units comprises:
    sending the first TB to the network device in the $t^{th}$ to $s^{th}$ time units in the s time units; and
    the sending uplink data to the network device in the s time units comprises:
    sending the second TB to the network device in the s time units.

3. The method according to claim 2, wherein the second TB does not comprise data in the first TB.

4. The method according to claim 2, wherein the method further comprises:
    receiving, by the terminal device in a subframe m+k, second resource allocation indication information sent by the network device, wherein the second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0;
    if sending the first TB to the network device in the $t^{th}$ to $s^{th}$ time units in the s time units, sending, by the terminal device, the second TB to the network device in the subframe m+n+k; and
    if sending the second TB to the network device in the s time units, sending, by the terminal device, a third TB to the network device in the subframe m+n+k, wherein the third TB comprises all data in the first TB.

5. The method according to claim 2, wherein the sending the first TB to the network device in the $t^{th}$ to $s^{th}$ time units in the s time units comprises:
    determining, based on a modulation and coding scheme (MCS) indicated by the network device, a first target MCS used when the first TB is sent to the network device in the $t^{th}$ to $s^{th}$ time units, and sending the first TB to the network device in the $t^{th}$ to $s^{th}$ time units by using the first target MCS; and the sending the second TB to the network device in the s time units comprises:
determining, based on the modulation and coding scheme (MCS) indicated by the network device, a second target MCS used when the second TB is sent to the network device in the s time units, and sending the second TB to the network device in the s time units by using the second target MCS.

6. The method according to claim 5, wherein the MCS indicated by the network device is an MCS used when the terminal device sends the uplink data to the network device in the s time units;
the determining, based on a modulation and coding scheme MCS indicated by the network device, a first target MCS used when the first TB is sent to the network device in the $t^{th}$ to $s^{th}$ time units comprises:
determining the first target MCS based on the MCS indicated by the network device and a correspondence between the MCS and a quantity of time units occupied when the terminal device sends the uplink data; and
the determining, based on the modulation and coding scheme MCS indicated by the network device, a second target MCS used when the second TB is sent to the network device in the s time units comprises:
determining the MCS indicated by the network device as the second target MCS.

7. A terminal device, comprising: a receiver, a processor and a transmitter; wherein
the receiver is configured to receive, in a subframe m, first resource allocation indication information sent by a network device, wherein the first resource allocation indication information is used to indicate a first time-frequency resource that is allocated by the network device to the terminal device and that is used for uplink transmission, the first time-frequency resource occupies a subframe m+n in a licensed-assisted access (LAA) cell, the subframe m+n comprises s time units, m is a subframe index number, n and s are positive integers, and a value of s is greater than or equal to 2;
the processor is configured to start to listen on a channel of the LAA cell before the subframe m+n; and
the transmitter is configured to: if the processor detects, after a start moment of the first time unit in the s time units and before a start moment of a $t^{th}$ time unit, that the channel is in an idle state, send uplink data to the network device in $t^{th}$ to $s^{th}$ time units in the s time units, wherein t is greater than 1 and less than or equal to s; wherein
the transmitter is further configured to: if the processor detects, before the start moment of the first time unit in the s time units, that the channel is in the idle state, send uplink data to the network device in the s time units.

8. The terminal device according to claim 7, wherein duration of the s time units is equal, and the processor is further configured to: before the processor detects that the channel is in the idle state, generate a first transport block (TB) and a second TB based on a TB size indicated by the network device and an amount of to-be-sent data in an uplink buffer of the terminal device, wherein a size of the second TB is greater than a size of the first TB;
the transmitter is configured to send the first TB to the network device in the $t^{th}$ to $s^{th}$ time units in the s time units; and
the transmitter is configured to send the second TB to the network device in the s time units.

9. The terminal device according to claim 8, wherein the second TB does not comprise data in the first TB.

10. The terminal device according to claim 8, wherein the receiver is further configured to receive, in a subframe m+k, second resource allocation indication information sent by the network device, wherein the second resource allocation indication information is used to indicate a second time-frequency resource that is allocated by the network device to the terminal device and that is used for uplink transmission, the second time-frequency resource occupies a subframe m+n+k in the LAA cell, the subframe m+k is the first subframe occupied when the terminal device receives resource allocation indication information sent by the network device after receiving the first resource allocation indication information, and k is a positive integer greater than or equal to 0; and
the transmitter is further configured to:
if the transmitter sends the first TB to the network device in the $t^{th}$ to $s^{th}$ time units in the s time units, send the second TB to the network device in the subframe m+n+k; and
if the transmitter sends the second TB to the network device in the s time units, send a third TB to the network device in the subframe m+n+k, wherein the third TB comprises all data in the first TB.

11. The terminal device according to claim 8, wherein the processor is configured to determine, based on a modulation and coding scheme (MCS) indicated by the network device, a first target MCS used when the first TB is sent to the network device in the $t^{th}$ to $s^{th}$ time units, and send the first TB to the network device in the $t^{th}$ to $s^{th}$ time units by using the first target MCS; and
the transmitter is further specifically configured to:
determine, based on the modulation and coding scheme MCS indicated by the network device, a second target MCS used when the second TB is sent to the network device in the s time units, and send the second TB to the network device in the s time units by using the second target MCS.

12. The terminal device according to claim 11, wherein the MCS indicated by the network device is an MCS used when the terminal device sends the uplink data to the network device in the s time units;
wherein the transmitter is configured to:
determine the first target MCS based on the MCS indicated by the network device and a correspondence between the MCS and a quantity of time units occupied when the terminal device sends the uplink data; and
the processor is configured to determine the MCS indicated by the network device as the second target MCS.

* * * * *